United States Patent [19]

Goldman

[11] Patent Number: 6,044,327
[45] Date of Patent: Mar. 28, 2000

[54] METHOD FOR QUANTIFYING THE LITHOLOGIC COMPOSITION OF FORMATIONS SURROUNDING EARTH BOREHOLES

[75] Inventor: William A. Goldman, Houston, Tex.

[73] Assignee: Dresser Industries, Inc., Dallas, Tex.

[21] Appl. No.: 08/970,171

[22] Filed: Nov. 13, 1997

[51] Int. Cl.$^7$ .................................................. G06F 19/00
[52] U.S. Cl. .................................................................. 702/11
[58] Field of Search .................................. 702/6, 7, 8, 9, 702/11, 12, 13; 73/152.05, 152.11

[56] References Cited

U.S. PATENT DOCUMENTS

| | | | |
|---|---|---|---|
| 4,617,825 | 10/1986 | Ruhovets | .............................. 73/152.05 |
| 4,646,240 | 2/1987 | Serra et al. . | |
| 4,916,616 | 4/1990 | Freedman et al. . | |
| 5,239,467 | 8/1993 | Kelly et al. . | |
| 5,251,286 | 10/1993 | Wiener et al. . | |
| 5,334,833 | 8/1994 | Case et al. . | |
| 5,416,697 | 5/1995 | Goodman . | |
| 5,461,562 | 10/1995 | Tabanou et al. . | |
| 5,539,704 | 7/1996 | Doyen et al. . | |

OTHER PUBLICATIONS

Theory, Measurement, and Interpretation of Well Logs; Richardson, TX 1994; 23 pgs. Zaki Bassiouni.
Essentials of Modern Open–Hole Log Interpretation by John T. Dewan; 11 pgs., 1983.
Computer Processing of Log Data Improves Production In Chaveroo Field; Jul. 1967; pp. 889–895; *Journal of Petroleum Technology.*
Geomathematical and Petrophysical Studies in Sedimentology; 17 pgs.
Geologic Log Analysis Using Computer Methods by John D. Doveton; *AAPG Computer Applications in Geology,* No. 2; 30 pgs. 1994.
A Computer–Oriented Generalized Porosity–Lithology Interpretation of Neutron, Density and Sonic Log by Martin H. Harris, R.B. McCammon; 10 pgs.
The Geological Interpretation of Well Logs; Second Edition; by Malcolm Rider; 35 pgs. 1996.
Schlumberger Log Interpretation Principles/Applications: *Schlumberger Educational Services;* 15 pgs. 1991.
J.A. Burke, M.R. Curtis, J.R. Cox, "Computer Processing of Log Data Improves Production In Chaveroo Field", pp. 889–895, Well Logging, Jul. 1967.
John T. Dewan, "Essentials of Modern Open–Hole Log Interpretation", pp. 210–227, NL Industries Inc., 1983.
Ed L. Bigelo, "Introduction to Wireline Log Analysis", pp. 185–231.

*Primary Examiner*—Donald E. McElheny, Jr.
*Attorney, Agent, or Firm*—Haynes and Boone, LLP

[57] ABSTRACT

A well logging instrument, embodied both in drillstring and in wireline logging systems, is caused to traverse an earth borehole and to generate lithology-related data. First and second lithology compositional models are constructed from such data and are combined to determine a range of possible solutions having an upper limit defined by a pure component model and a lower limit defined by a proportional mixture model, thus allowing the maximum concentration of any lithologic component to vary between 0% and 100%. The exact value of the lithology lies between the upper and lower limits in the range of values and can be calibrated to a mineralogic analysis of actual core samples or drill cuttings.

30 Claims, 5 Drawing Sheets

METHOD FOR QUANTIFYING THE LITHOLOGIC COMPOSITION OF FORMATIONS SURROUNDING EARTH BOREHOLES

FIELD OF THE INVENTION

The present invention is directed generally to new and improved methods for using wireline and/or measurement while drilling (MWD) logs to quantify the lithology of formations surrounding earth boreholes. More particularly, the present invention is directed to the modeling of such lithology based upon such logs using two different approaches to establish a range of values having upper and lower compositional limits for such lithology.

BACKGROUND OF THE INVENTION

It is well known in the art of geophysical prospecting to conduct MWD logging of earth formations while a well is being drilled and to conduct wireline logging of such earth formations after the well has been drilled, all in an attempt to evaluate the lithology of the formations, and thus to provide indications whether oil and/or gas can be produced out of such formations.

While the estimation of lithologic component fractions from well logs is common practice by those skilled in this art, existing methods do not correctly identify the range of possible solutions and some, assume the existence of a unique solution. There are in fact an infinite number of possible solutions that lie within a quantifiable range of values. In addition, some existing methods that attempt to determine a unique solution are based on a mathematical model involving the use of simultaneous equations. Key shortcomings of this approach include:

- the assumption that each well log is equally accurate in distinguishing all lithologic components
- the assumption that all lithologic components must exist in pure form at a discrete value for a given log
- the assumption that each lithologic component exists to some extent over the entire range of possible log values (i.e. restricted ranges are not possible)
- the assumption that a linear relationship exists between log data and lithologic component fractions Empirical data shows these assumptions to be incorrect. The present invention addresses the problem by modeling lithology in two different ways to set compositional limits, thereby establishing the valid range of all possible solutions. A "pure component" model defines the upper compositional limit and a "proportional mixture" model defines the lower limit. The exact solution selected within this range can be calibrated to a mineralogical analysis of actual core samples, or based on knowledge of local geology.

The invention also recognizes and utilizes the fact that some logs are more accurate than others in resolving a given lithologic component. A particular log can be empirically weighted to a particular lithologic component. For instance, the neutron log may be far more accurate than the sonic log in resolving a coal streak; the gamma ray may be much more accurate than any other log in resolving shale. Prior art methods do not take this key factor into account.

RELATED APPLICATIONS

The following U.S. Patent Applications, each assigned to Dresser Industries, Inc., the assignee of this present application, are related to the present invention in a general way:

U.S. Pat. No. 5,794,720 to Goldman, W. A., and Smith, L. M., "Method of Assaying Downhole Occurrences and Conditions";

U.S. Pat. No. 5,704,436 to Goldman, W. A., and Smith, L. M., "Method of Regulating Drilling Conditions Applied to a Well Bit";

U.S. Pat. No. 5,767,399 to Goldman, W. A., and Smith, L. M., "Method of Assaying Compressive Strength of Rock".

PRIOR ART

The prior art is replete with various methods and apparatus intended to quantify lithologic component fractions from well logs, including the following publications:

Bassiouni, Z., "Theory, Measurement, and Interpretation of Well Logs", Society of Petroleura Engineers (SPE) textbook series, Richardson, Tex. 1994 Bigelow, E. L., "Introduction to Wireline Log Analysis", Western Atlas International, Houston, 1992

Burke, J. A., Curtis, M. R., and Cox, J. T., 1967, "*Computer Processing of Log Data Enables Better Production in Chaveroo Field*", J. Pet. Tech. (July, 1967) 889–895

Dewan, J. T., "*Essentials of Modern Open-Hole Log Interpretation*", PennWell, Tulsa, Okla. 1983

Doveton, J. H., and Cable, H. W., "*Fast Matrix Methods for the Lithological Interpretation of Geophysical Logs*", in Geomathematical and Petrophysical Studies in Sedimentology, Gill, D., and Merriam, D. F., eds., Pergamon, Oxford, 1979, 101–106.

Doveton, J. H., *Geologic Log Analysis Using Computer Methods*, American Association of Petroleum Geologists, Tulsa, 1994

Harris, M. H., and McCammon, R. B., "*A Computer-Oriented Generalized Porosity-Lithology Interpretation of Neutron, Density and Sonic Logs*", J. Pet. Tech. (February, 1971) 239–248

Rider, M. H., *The Geological Interpretation of Well Logs*, Gulf Publishing, Houston, 1996

*Schlumberger Log Interpretation Principles/Applications*, Schlumberger, Houston, 1991

In addition to the above-noted publications, those skilled in this art are aware of the existence of hundreds, perhaps thousands of patents, USA and world-wide, related to MWD and wireline logging and which are directed to measuring and/or determining the lithology of earth formations surrounding an earth borehole. By way of a very small sampling of such prior art, this would include the following U.S. Patents:

U.S. Pat. No. 4,916,616 to Robert Freedman et al, entitled "Self-Consistent Log Interpretation Method";

U.S. Pat. No. 5,239,467 to Michael C. Kelly et al, entitled "Method for Enhancing Geophysical Data by Non-Linear Compression of the Dynamic Range";

U.S. Pat. No. 5,521,286 to Jack M. Weiner et al, entitled "Method for Estimating Formation Permeability from Wireline Logs Using Neural Networks";

U.S. Pat. No. 5,334,833 to Charles Case et al, entitled "Sensitivity Function Technique for Mocieling Nuclear Tools";

U.S. Pat. No. 5,416,697 to Harvey E. Goodman, entitled "Method for Determining Rock Mechanical Properties using Electrical Log Data";

U.S. Pat. No. 5,461,562 to Jacques R. Tabanou et al, entitled "Method and Apparatus for Detecting And Quantifying Hydrocarbon Bearing Laminated Reservoirs on a Workstation"; and U.S. Pat. No. 5,539,704 to Philippe M. Doyen et al, entitled "Bayesian Sequential Gaussian Simulation of Lithology With Non-Linear Data".

OBJECTS OF THE INVENTION

It is the primary object of the present invention to model the lithologic composition of formations surrounding an earth borehole, as accurately as possible based upon analysis of well logs, preferably in conjunction with analysis of core samples taken from such formations.

Another object of the present invention is to provide new and improved methods and apparatus for modeling of hydrocarbon reservoirs in earth formations.

SUMMARY OF THE INVENTION

The objects of the invention are accomplished, generally, by new and improved methods which provide a dual compositional model identifying the range of all possible lithologic solutions, the upper limit of the range being defined by a pure component model and the lower limit of the range being defined by a proportional mixture model, thus allowing the maximum concentration of any lithologic component to vary from 0 to 100%.

Additional feature, and advantages of the present invention are embodied in the following listing:

the true solution lies within a range defined by the two compositional limits and can be calibrated to a mineralogical analysis of actual core samples. This achieves the greatest possible verifiable accuracy from well logs.

if sufficient core analyses are available to fully calibrate the lithology model, then it is theoretically possible to extract a more accurate porosity from any lithology-sensitive log suite including the neutron-density. This would then become the preferred method to determine porosity.

a particular well log can be weighted to resolve a particular lithologic component more or less accurately than another log. For instance, the gamma ray may be 90% more accurate than the sonic log in resolving shale; on the other hand the sonic may be more accurate than the gamma ray in resolving non-shales. Prior art methods generally do not take this key factor into account.

prior art mathematical models that rely on simultaneous equations to arrive at a solution are prone to computational problems including division by zero errors and negative component concentrations. The frequency of such errors increases exponentially as the number of lithologic components increases due to the nature of matrix algebra. Such errors also occur because of the incorrect assumption that all well logs are equally accurate in resolving all lithologic components, and because the model is not tolerant of errors in the well log data. Unfortunately, bad log data is an all too frequent occurrence in practice. It is probably fair to say that all well log data is flawed to some extent due to the complex interaction of a multitude of variables that exert an influence in the logging environment. For this reason it is crucial to calibrate any log derived analysis to a core analysis if possible. At present, core analysis is the only available means to absolutely verify a log derived analysis.

the dual compositional model of the present invention is tolerant of bad log data and will consistently yield reasonable solutions where prior art methods would fail. Division by zero errors and negative concentration problems are avoided.

because of the limitations of prior art methods, a satisfactory solution typically entails a time-consuming trial and error process, particularly with complex lithologies. The present invention minimizes this trial and error process. In short, it is significantly faster and more accurate than prior art methods.

the method is applicable with any number or combination of lithology sensitive logs and any number or combination of lithologic components. This is a major advantage over prior art methods where the number of lithologic components is generally restricted by the number of well logs available.

the simultaneous equations solution used by some prior art methods assumes that pure components exist at a discrete value for each log; in nature this is generally not the case. The method requires n logs to resolve n+1 components for a "unique" solution. If there are more than n+1 components, then a "maximum proportional mixture" solution is usually assumed where all components are present to the greatest extent possible; again, in nature this is generally not the case.

ranges of existence for a each lithologic component can be specified based on laboratory measurement or experience with local geology. Prior art methods do not allow for such component ranges.

the new method can model linear or non-linear behavior. Prior art methods generally assume linear behavior.

with prior art methods it is very difficult, and often impossible, to calibrate a log-derived lithology analysis to a laboratory measurement of mineralogical composition from a core sample. With the dual compositional model this is always possible and readily achieved by design.

These and further objects, features and advantages of the present invention will become apparent from the detailed description of the drawings, in conjunction with a reading of the specification and appended claims.

DETAILED DESCRIPTION OF PREFERRED EMBODIMENTS

Figure 5:
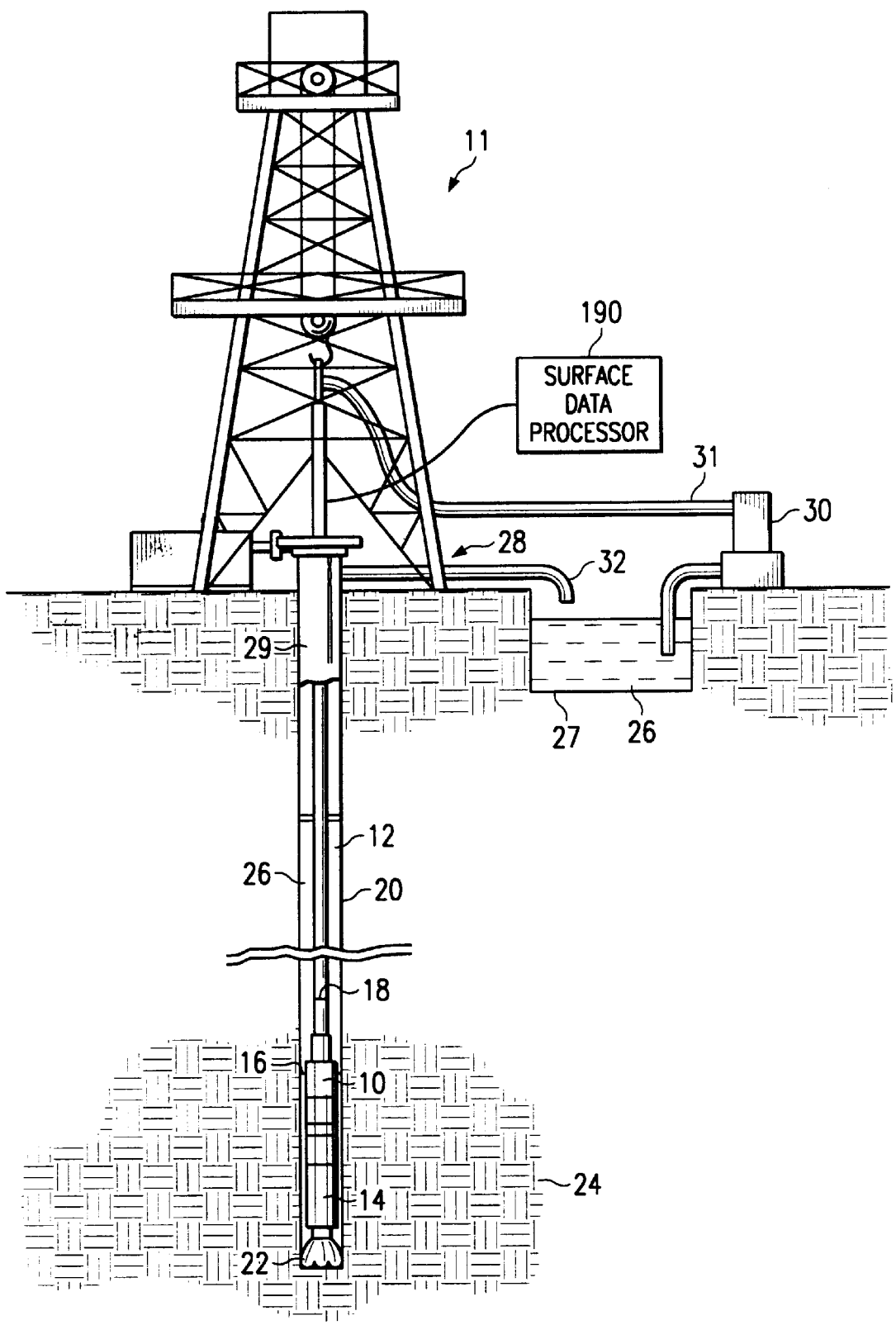
FIG. 5 is an elevated diagrammatic view, partly in cross-section, of a drilling rig and drill string incorporating an MWD well logging instrument in accord with the present invention.

Referring now specifically to the drawings, and first to FIG. 5, there is shown a drilling rig 11 disposed atop a borehole 12. A logging tool 10 is carried by a sub 14, typically a drill collar, incorporated into a drill string 18 and disposed within the borehole 12. A drill bit 22 is located at the lower end of the drill string 18 and carves a borehole 12 through the earth formations 24. Drilling mud 26 is pumped from a storage reservoir pit 27 near the wellhead 28, down an axial passageway (not illustrated) through the drill string 18, out of apertures in the bit 22 and back to the surface through the annular region 16. Metal casing 29 is positioned in the borehole 12 above the drill bit 22 for maintaining the integrity of the upper portion of the borehole 12.

Still referring to FIG. 5, the annular 16 between the drill stem 18, sub 14 and the sidewalls 20 of the borehole 12 forms the return flowpath for the drilling mud. Mud is pumped from the storage pit 26 near the well head 28 by a pumping system 30. The mud travels through a mud supply line 31 which is coupled to a central passageway extending throughout the length of the drill string 18. Drilling mud is, in this manner, forced down the drill string 18 and exits into the borehole through apertures in the drill bit 22 for cooling and lubricating the drill bit and carrying the formation cuttings produced during the drilling operation back to the surface. A fluid exhaust conduit 32 is connected from the annular passageway 16 at the well head for conducting the return mud flow from the borehole 12 to the mud pit 26. The drilling mud is typically handled and treated by various apparatus (not shown) such as outgassing units and circulation tanks for maintaining a preselected mud viscosity and consistency.

The logging tool or instrument 10 can be any conventional logging instrument such as acoustic (sometimes referred to as sonic), neutron, gamma ray, density, photoelectric, nuclear magnetic resonance, or any other conventional logging instrument, or combinations thereof, which can be used to measure lithology of formations surrounding an earth borehole.

Because the logging instrument is embodied in the drill string 18 in FIG. 5, the system is considered to be an MWD system, i.e., it logs while the drilling process is under way. The logging data can be stored in a conventional downhole recorder (not illustrated), which can be accessed at the earth's surface when the drill string 18 is retrieved, or can be transmitted to the earth's surface using telemetry such as the conventional mud pulse telemetry systems. In either event, the logging data from the logging instrument 10 eventually reaches the surface data processor 190 to allow the data to be processed in accord with the present invention as described herein.

Figure 6:
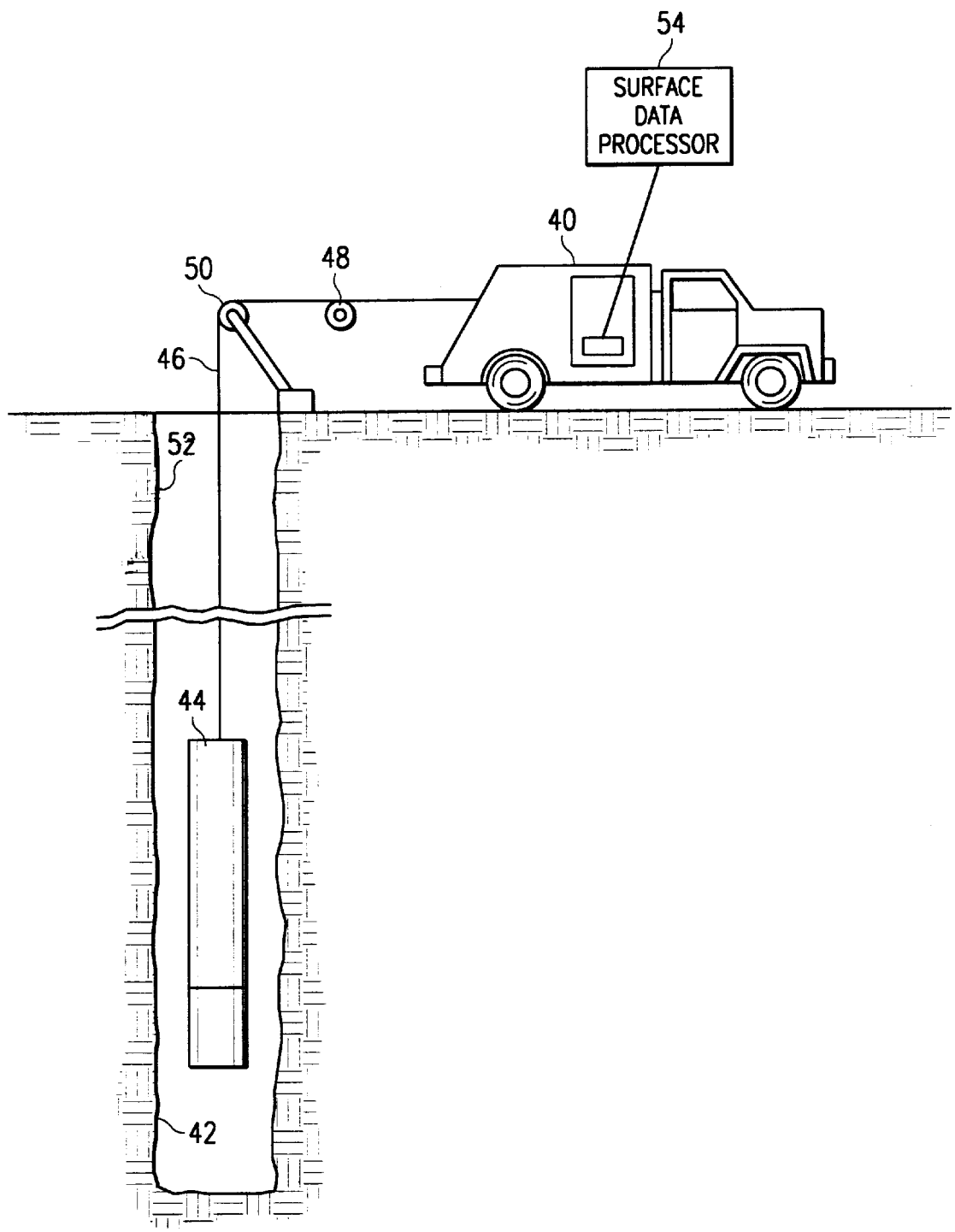
FIG. 6 is an elevated view, partly in cross-section, of a wireline logging instrument suspended in an earth borehole in accord with the present invention.

Referring now to FIG. 6, a wireline logging truck 40 situated at the surface of a wellbore 42 is illustrated. A wireline logging instrument 44 is suspended in the borehole 42 by a logging cable 46 which passes over a pulley 48 and a depth measurement sheave 50. As the logging instrument traverses the borehole 42, it logs the formations 52 surrounding the borehole 42 as a function of depth. The logging data is transmitted through the cable 46 to the surface data processor 54 located in or near the logging truck 40 to process the logging data in accord with the present invention as herein described. As with the MWD embodiment described with respect to FIG. 5, the wireline embodiment described with respect to FIG. 6 may be any conventional logging instrument which can be used to measure the lithology of formations surrounding an earth borehole, such as acoustic, neutron, gamma ray, density, photoelectric, nuclear magnetic resonance, or any other conventional logging instrument, or combinations thereof, which can be used to measure lithology.

In practicing the present invention, whether in the MWD mode of FIG. 5 or in the wireline mode of FIG. 6, the logging data is first transferred to a surface data processor. With either mode, the dual compositional model presupposes the existence of a suite of lithology sensitive logs. Core samples are desirable but are not strictly necessary. It is assumed that formation porosity can be extracted from the log suite using any of several methods that are currently in use by the industry. A lithology independent porosity, such as the nuclear magnetic resonance or th(e neutron-density porosity, is preferred. Calibration of the log derived porosity to measured core porosity is also preferred for greatest verifiable accuracy. If sufficient core analyses are available to calibrate the model, it is theoretically possible to compute a more accurate porosity.

First, the effects of porosity are removed from the raw log data by converting the logs to matrix values. Matrix logs are porosity independent and reflect the properties of the formation matrix exclusively. For instance, for the sonic log, the following well known equation was first proposed by Wyllie:

$$t_{LOG}=(1-\emptyset)t_M+\emptyset t_F \qquad (1)$$

where:

$t_{LOG}$ raw sonic log data, or formation transit time ($\mu$s/ft)

$t_M$ transit time of the formation matrix ($\mu$s/ft)

$t_F$ transit time of the fluid occupying the formation pore space ($\mu$s/ft)

$\emptyset$ formation porosity (pore volume expressed as a fraction of total volume)

Solving for the matrix transit time, $t_M$, yields:

$$t_M=(t_{LOG}-\emptyset t_F)/(1-\emptyset) \qquad (2)$$

Similar expressions for matrix values can be derived for any lithology sensitive log including the density, neutron, and gamma ray logs. Note that the photoelectric log must be converted to the volumetric cross section, U, before it can be converted to a matrix value. All such expressions have been disclosed in prior art, but their application in the following method is novel.

The method will yield more accurate results if the lithologic components in the interval of interest are known either from actual core analyses, drill cuttings information or "mud" logs, or from knowledge of local geology from other offset wells in the vicinity of the subject well (i.e. the well in which the well logs were run). The method may be applied without such knowledge but accuracy will suffer as a result because the logging technology currently available to the industry cannot discriminate between non-shale components with absolute certainty. The photoelectric log is more sensitive to non-shale components than the other logs and will generally yield more accurate results. In other words, it is always better to know what components are present from a log independent source so that the log analysis will not find components that are not physically present. This is a limitation of all lithology models.

The use of simultaneous equations to model lithologic composition is deliberately avoided because of several inherent problems with this approach as described above. A novel way to model component fractions that avoids these pitfalls is now described.

Dual Compositional Model

Figure 1:
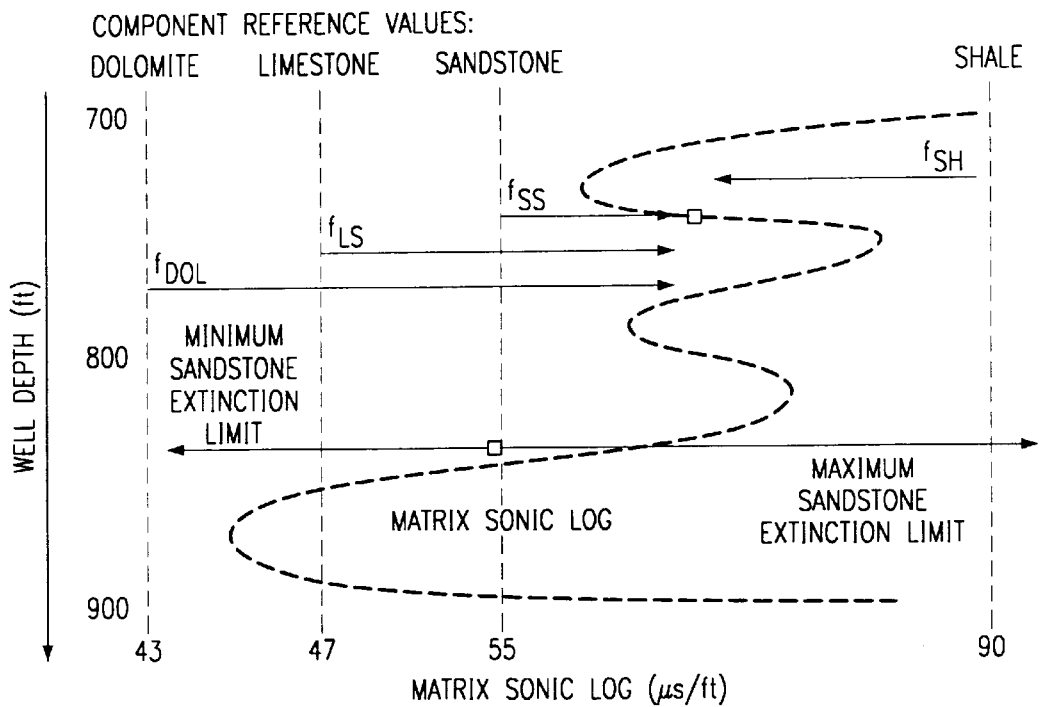
FIG. 1 is a graphic representation plotting depth in the well (the earth borehole against a matrix sonic log expressed in $\mu$sec/ft.), providing lithology concentration factors and extinction limits.

The concentration of a particular lithologic component within the formation matrix is proportional to the difference between a given log value and a reference log value associated with the component in its purest form. For instance, sandstone has a reference sonic value of about 55 ($\mu$s/ft). Maximum sandstone concentration within the matrix occurs at this value, and decreases proportionately as the log data moves away from the value, for example, as illustrated in FIG. 1 of the drawings. There may be log values above and below the reference value where the sandstone concentration diminishes to zero. These "extinction limits" can be measured or inferred from laboratory tests.

The concentration of sandstone may now be modeled as follows, using the density log for illustration purposes. If a given density log value is greater than the sandstone reference density, that is if $P_{LOG} \geq P_{SS}$ then:

$$f_{SS} = ((P_{LOG} - P_{SS})/(P_{SSmax} - P_{SS}))^\alpha \quad (3)$$

On the other hand, if the log density is less than the reference density, that is if $P_{LOG} \leq P_{SS}$ then:

$$f_{SS} = ((P_{SS} - P_{LOG})/(P_{SS} - P_{SSmin}))^\alpha \quad (4)$$

where:

$f_{SS}$ concentration factor of sandstone in matrix (fraction)
$P_{LOG}$ density log value (g/cc)
$P_{SS}$ reference density log value for sandstone, 2.65 (g/cc)
$P_{SSmax}$ maximum extinction limit for sandstone density (g/cc)
$P_{SSmin}$ minimum extinction limit for sandstone density (g/cc)
$\alpha$ mineralogy exponent Concentration factors for other components and other logs can be derived similarly. Note that the sandstone concentration is reduced to extinction when its concentration factor $f_{SS}=1$. When the density log value coincides with the sandstone reference value, that is when $P_{LOG}=P_{SS}$, then $f_{SS}=0$ and the sandstone concentration reaches a maximum value. This behavior can be mathematically modeled as follows:

$$C_{SS} = C_{SSmax}(1 - f_{SS}) \quad (5)$$

where:

$C_{SS}$ concentration of sandstone in matrix (fraction, non-normalized)
$C_{SSmax}$ maximum concentration of sandstone in matrix (fraction, non-normalized)

The concentration of other components can be modeled similarly. These concentrations are not normalized, that is to say, they do not sum to one. Normalizing the components is accomplished by dividing each component by the sum of all components present. For instance, a three component mixture composed of sandstone, limestone, and shale would be normalized as follows:

$$C_{SS}/(C_{SS}+C_{LS}+C_{SH}) + C_{LS}/(C_{SS}+C_{LS}+C_{SH}) + C_{SH}/(C_{SS}+C_{LS}+C_{SH}) = 1 \quad (6)$$

where:

$C_{LS}$ concentration of limestone in matrix (fraction, non-normalized)
$C_{SH}$ concentration of shale in matrix (fraction, non-normalized)

The normalized concentration for sandstone, $V_{SS}$, may now be expressed as:

$$V_{SS} = C_{SS}/(C_{SS}+C_{LS}+C_{SH}) \quad (7)$$

and eq. (6) can be simplified to:

$$V_{SS}+V_{LS}+V_{SH}=1 \quad (8)$$

where:

$V_{SS}$ sandstone concentration (fraction, normalized)
$V_{LS}$ limestone concentration (fraction, normalized)
$V_{SH}$ shale concentration (fraction, normalized)

Figure 2:
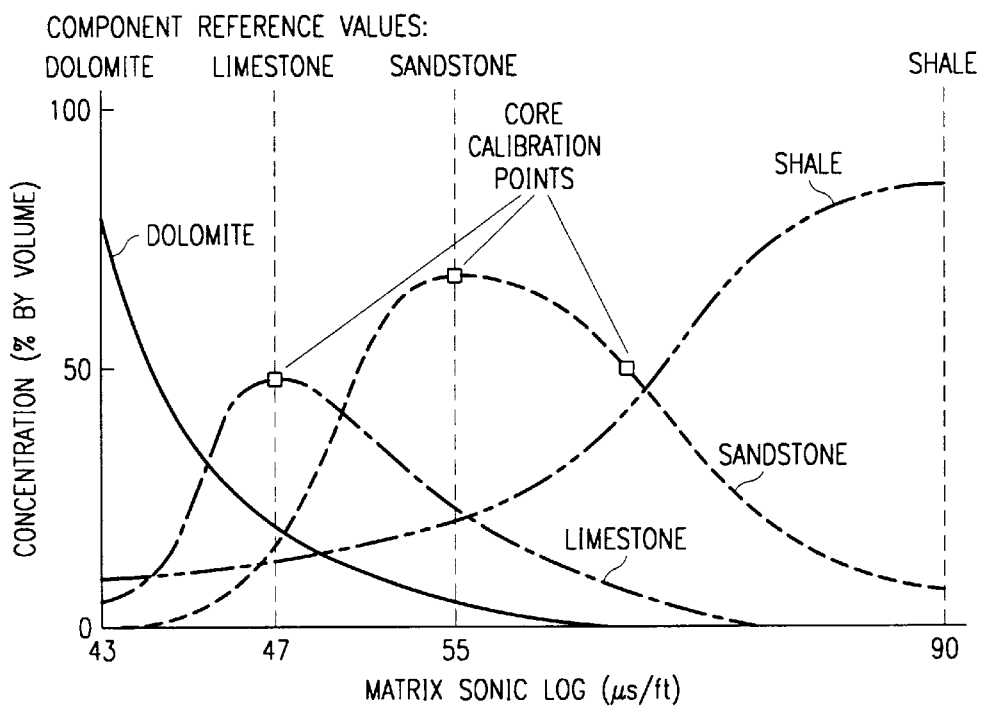
FIG. 2 is a graphic representation plotting lithology concentration of various components against a matrix sonic log expressed in $\mu$sec/ft., providing an example of a proportional mixture model.

The model described by eq. (8) is referred to as a proportional mixture model since it precludes the existence of any component in pure form, even at that component's reference value provided there are multiple components with overlapping ranges of existence. In fact, the model assumes that the concentrations of all components are proportional to the difference between their respective reference values and a given log value of interest, for example, as illustrated in FIG. 2 of the drawings. If all components are present to their maximum non-normalized concentrations (i.e., if $C_{SSmax}=C_{LSmax}=C_{SHmax}=1$) then eq. (8) represents the maximum possible concentration of all components present. In essence, it represents a theoretical equilibrium concentration.

At equilibrium concentration, the proportional mixture model provides a valuable mathematical reference. However, such equilibrium concentrations do not generally occur in nature. It is, in fact, possible for the maximum concentration of any component to range from 0–100% at that component's reference value (i.e., $0 \leq V_{SS} \leq 1$). The precise value of this maximum concentration is most accurately determined from a compositional analysis of an actual core sample. The proportional mixture model does allow the maximum concentration of a given component to drop to zero, by allowing $C_{SSmax}$ to drop to zero ($C_{SSmax}$ can range in value from $0 \leq C_{SSmax} \leq 1$). However, the model does not permit a component to exist in pure form. A pure component model is therefore needed to describe this latter situation.

Pure Component Model

A pure component model can be derived by multiplying the non-normalized concentration of each component by the concentration factors of all other components present as follows:

$$C_{SSP} = C_{SSmax}(1-f_{SS})f_{LS}f_{SH} \quad (9)$$

where:

$C_{SSP}$ sandstone concentration, pure component model (fraction, non-normalized)

Note that if $C_{SSmax}=0$ and $f_{SS}=0$ then the maximum sandstone concentration is zero (i.e. the component is not physically present) and $f_{ss}$ is arbitrarily set equal to one to avoid a division by zero error when calculating the concentrations of the other components.

Other components can be modeled similarly. Normalizing the components yields the following expression for the pure component model:

$$C_{SSP}/(C_{LSP}+C_{SHP}) + C_{LSP}/(C_{SSP}+C_{LSP}+C_{SHP}) + C_{SHP}/(C_{SSP}+C_{LSP}+C_{SHP}) = 1 \quad (10)$$

where:

$C_{LSP}$ limestone concentration, pure component model (fraction, non-normalized)
$C_{SHP}$ shale concentration, pure component model (fraction, non-normalized)

The normalized concentration for sandstone, $V_{SSP}$, may now be expressed as:

$$V_{SSP} = C_{SSP}/(C_{SSP}+C_{LSP}+C_{SHP}) \quad (11)$$

and eq. (10) can be simplified to:

$$V_{SSP}+V_{LSP}+V_{SHP}=1 \tag{12}$$

where:

$V_{SSP}$ sandstone concentration, pure component model (fraction, normalized)

$V_{LSP}$ limestone concentration, pure component model (fraction, normalized)

$V_{SHP}$ shale concentration, pure component model (fraction, normalized)

Figure 3:
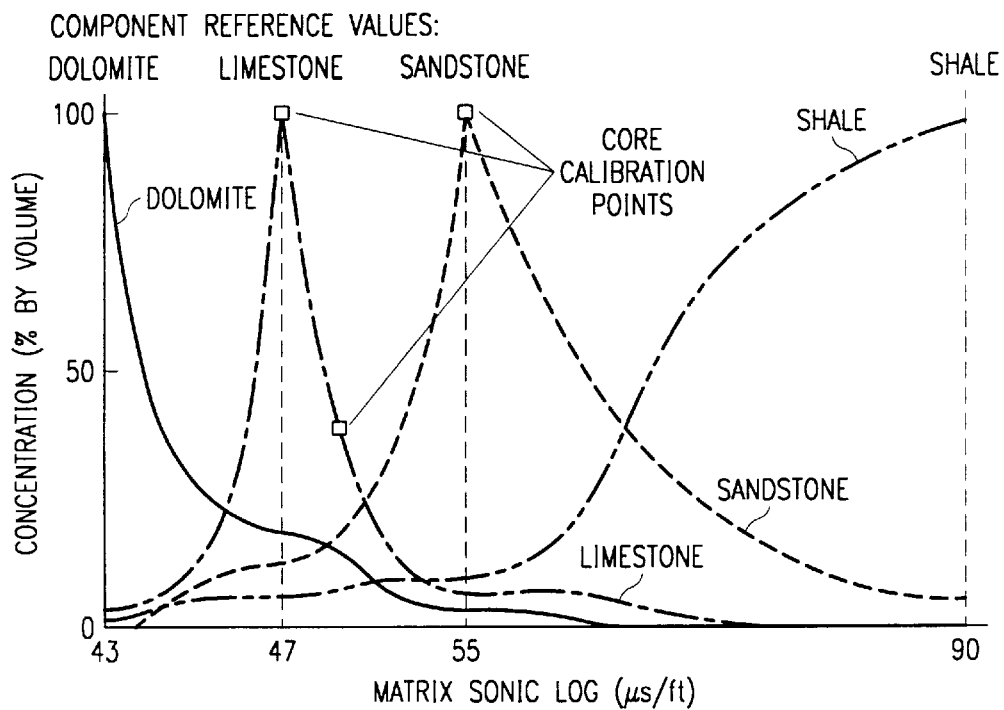
FIG. 3 is a graphic representation plotting lithology concentration of various individual components against a matrix sonic log expressed in $\mu$sec/ft., providing an example of a pure component model.
Figure 4:
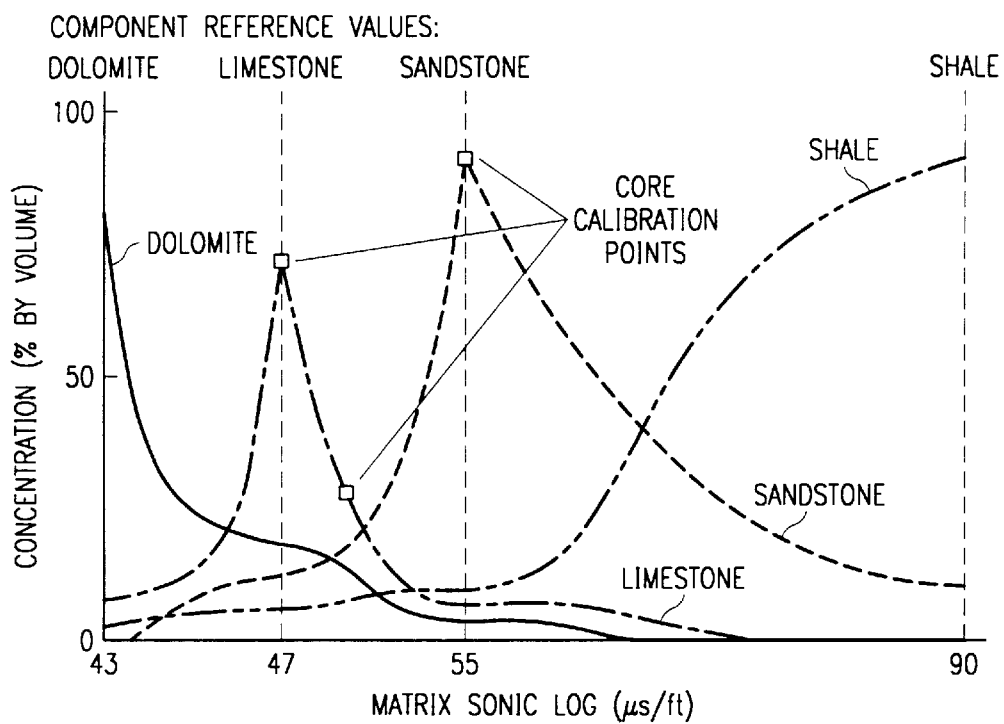
FIG. 4 is a graphic representation plotting lithology concentration of various individual components against a matrix sonic log in $\mu$sec/ft, providing an example of a dual compositional mode.

The pure component model guarantees that a given component will be 100% pure at its reference value as illustrated in FIG. 3 of the drawings. Impure concentrations, or more precisely, concentrations that lie between the proportional and pure limits, can be modeled by taking a weighted average of the two models hence providing a dual compositional model. For instance, 90% of the pure model value and 10% of the proportional mixture value would yield an impure concentration between these limits, for example, as illustrated in FIG. 4 of the drawings. In this fashion, the model can be calibrated to a mineralogical analysis of an actual core sample, thereby providing the greatest possible verifiable accuracy.

For instance, for sandstone:

$$V_{SSC}=V_{SS}(1-P)+V_{SSP}P \tag{13}$$

where:

$V_{SSC}$ calibrated sandstone concentration, dual compositional model

P pure component model weighting factor (fraction, empirical)

Calibrated concentrations can be calculated in a similar fashion for other components and other logs.

The preceding text describes the dual compositional model as applied to a single well log. Multiple well logs are analyzed similarly by applying the model to each log individually.

In a computerized application, it is useful to visually inspect the lithology derived from each log individually (in this context, lithology means the concentration of each component as a function of depth). If the log data is reasonably accurate and the components selected for analysis are physically present, then the peak concentration of each component should be in reasonably good depth alignment among all of the logs. For instance, if a sandstone stratum is physically present, then all of the logs individually should indicate peak sandstone concentration at roughly the same depth (in fact, these peak concentrations could be used as reference points for depth alignment purposes). Misalignment of peak concentrations is an indication of inaccurate log data. If the peaks are misaligned, or if different components are seen by different logs at the: peaks, then this indicates either a data quality problem with one or more of the logs, or the component selected may not be physically present and another component should be selected in its place (also, peak concentrations will vary in amplitude due to a particular log's ability to resolve a particular component). The use of simultaneous equations by prior art methods in such circumstances results in negative component concentrations, division by zero errors, or method failure. One must resort to arbitrarily adjusting the reference values of each component in order to force an acceptable solution. This process has been described as "a series of maneuvers which are Byzantine variations on a simple theme that seeks to determine the most feasible set of components whose number is prescribed by the log suite to give a unique solution" by J. H. Doveton and H. W. Cable in "Fast Matrix Methods for the Lithological Interpretation of Geophysical Logs", in *Geomathematical and Petrophysical Studies in Sedimentology*, Gill, D., and Merriam, D. F., eds., Pergamon, Oxford, 1979, page 106. Of course, such arbitrary adjustments mask a deeper problem. Prior art methods assume that component concentrations are 100% pure at their reference log values. With the proposed dual compositional model, the maximum component concentration does indeed occur at the reference value as it should, but the maximum concentration may vary from 0–100% as it does in nature.

Multiple logs may be analyzed simultaneously by applying an empirical weighting factor to each component oil each log. These weighting factors may be based on a statistical analysis of a given log's ability to resolve a given component. For instance, the weighting factors could be based on the normalized cumulative volumes of each component from each log over an interval of interest. For instance, consider a three (3) component system consisting of limestone, sandstone and shale, with three (3) well logs available, namely the gamma ray, sonic, and density logs. Weighting factors for the limestone component could be estimated as follows:

$$(P_{LS})_{GAMMA}=[\Sigma(V_{LS})_{GAMMA}/(\Sigma(V_{LS})_{GAMMA}+\Sigma(V_{LS})_{SONIC}+\Sigma(V_{LS})_{DENSITY})] \tag{14}$$

$$(P_{LS})_{SONIC}=[\Sigma(V_{LS})_{SONIC}/(\Sigma(V_{LS})_{GAMMA}+\Sigma(V_{LS})_{SONIC}+\Sigma(V_{LS})_{DENSITY})] \tag{15}$$

$$(P_{LS})_{DENSITY}=[\Sigma(V_{LS})_{DENSITY}/(\Sigma(V_{LS})_{GAMMA}+\Sigma(V_{LS})_{SONIC}+\Sigma(V_{LS})_{DENSITY})] \tag{16}$$

where:

$\Sigma(V_{LS})_{GAMMA}$ cumulative limestone concentration from gamma ray log $\Sigma(V_{LS})_{SONIC}$ cumulative limestone concentration from sonic log $\Sigma(V_{LS})_{DENSITY}$ cumulative limestone concentration from density log $(P_{LS})_{GAMMA}$ limestone weighting factor for gamma ray log $(P_{LS})_{SONIC}$ limestone weighting factor for sonic log $(P_{LS})_{DENSITY}$ limestone weighting factor for density log Weighting factors for the other components may be derived similarly. Alternatively, the weighting factors can be measured or inferred from laboratory tests, or estimated based on experience with local geology and the specific logging tools used. The weighting factors are crucial to obtaining accurate results. For instance, it is well known that the gamma ray log is generally the best single-log shale indicator. A coal streak might be detected by the neutron log but missed entirely by the gamma ray or only partially resolved by the sonic log. If the quality of an individual log is poor then low weighting factors can be applied to the log's components to minimize the impact of the log on the overall analysis.

For instance, consider a four (4) component mixture and three (3) well logs as follows:

|       | Components |       |       |       |
|-------|------------|-------|-------|-------|
| Logs  | $V_{DOL}P_{DOL}$ | $V_{LS}P_{LS}$ | $V_{SS}P_{SS}$ | $V_{SH}P_{SH}$ |
| Gamma Ray | (0.1)(0.333) | (0.1)(0.1) | (0.2)(0.1) | (0.6)(0.8) |
| Sonic | (0.1)(0.333) | (0.2)(0.5) | (0.5)(0.4) | (0.2)(0.1) |
| Density | (0.2)(0.333) | (0.1)(0.4) | (0.3)(0.5) | (0.4)(0.1) |
| Total by Column | 0.13 | 0.15 | 0.37 | 0.54 | where:

$V_{DOL}$ dolomite concentration $V_{LS}$ limestone concentration $V_{SS}$ sandstone concentration $V_{SH}$ shale concentration $P_{DOL}$ dolomite weighting factor $P_{LS}$ limestone weighting factor $P_{SS}$ sandstone weighting factor $P_{SH}$ shale weighting factor Also note that the following constraints apply:

$$V_{DOL}+V_{LS}+V_{SS}+V_{SH}=1 \tag{17}$$

$$(P_{DOL})_{GAMMA\ RAY\ LOG}+(P_{DOL})_{SONIC\ LOG}+(P_{DOL})_{DENSITY}1 \tag{18}$$

As indicated by eq. (18), the empirical weighting factors, $P_{DOL}$, $P_{LS}$, $P_{SS}$, and $P_{SH}$, are constrained to sum to one for each lithologic component, not for each log. The numerical example above shows that the weighting factors are applied vertically by column. The weighted shale concentration, $V_{SHW}$, is calculated as follows:

$$V_{SHW}=(V_{SH}P_{SH})_{GAMMA\ RAY\ LOG}+(V_{SH}P_{SH})_{SONIC\ LOG}+(V_{SH}P_{SH})_{DENSITY\ LOG} \tag{19}$$

In the example, $V_{SHW}=0.54$. Weighted concentrations for the other non-shale components are calculated similarly. The final shale concentration, $V_{SHF}$, is set equal to the weighted shale concentration, or:

$$V_{SHF}=V_{SHW} \tag{20}$$

A normalizing factor, k, is then calculated for the remaining non-shale components as follows:

$$k=(1-V_{SHW})/(V_{DOLW}+V_{LSW}+V_{SSW}) \tag{21}$$

The final concentrations or the non-shale components are now given by:

$$V_{DOLF}=V_{DOLW}k \tag{22}$$

$$V_{LSF}=V_{LSW}k \tag{23}$$

$$V_{SSF}=V_{SSW}k \tag{24}$$

Log Error Suppression

Under certain conditions, data from some logs can be accurate while data from others can be inaccurate or erroneous. Under such circumstances it is desirable to suppress the incorrect log data. For instance, it is often the case that a coal stratum is well resolved by the density log, but poorly or incorrectly resolved by the sonic. The sonic matrix log often "sees" coal as dolomite and/or limestone due to the unusually high coal porosity.

In general then, for certain unusual lithologies such as coal, salt, and anhydrite for instance, it is desirable to suppress certain components seen by certain logs. The specific components to be suppressed depend on the logging tools used, the logging environment, and the geology. For instance, a computerized application might utilize a threshold coal volume to suppress erroneous dolomite and limestone, or expressed in computer logic:

IF $V_{coal}>5\%$ THEN $V_{dolomite}=0$ and $V_{limestone}=0$

The above line of code may be translated as follows: "If the volume of coal seen by the density log exceeds a threshold volume of 5 percent, then set the volumes of dolomite and limestone seen by the sonic matrix log to zero." Similar logic can be applied to other logs and components as necessary.

Alternate and Equivalent Methods

1) An alternate, but less preferred, approach would be to normalize, or partially normalize, the final shale concentration, $V_{SHF}$, along with the non-shales.

2) As mentioned above, an equivalent approach would be to apply the method to solve for porosity as well as lithology simply by treating porosity as another lithologic component (and, of course, it is another component). In this case, the raw log data could be used without having to convert to matrix values. Appropriate weighting factors could be applied to the logs to solve for porosity. For instance, a more accurate neutron-density porosity could be extracted by applying a weighting factor of 50% to both the neutron and density logs with all other logs receiving a zero porosity weighting; or, a sonic porosity could be extracted by applying a 100% weighting to the sonic porosity, and so on. If sufficient core analyses are available to fully calibrate the lithology model, then it is theoretically possible to extract a more accurate porosity from any log suite using this method. If such core analyses are available, then this would become the preferred method to determine porosity. Another approach would be to solve iteratively for both porosity and lithology. Porosity would be used to solve for lithology, and then lithology would subsequently be used to solve for a more accurate porosity. This process of successive substitutions would be repeated iteratively until the results converge within a desired accuracy range. It would also be possible to introduce more complex logic that would utilize the most accurate porosity from multiple logs based on which porosity value is; more accurate under given conditions. For instance, the sonic porosity might be more accurate than the neutron-density in gas zones.

3) An equivalent, but less preferred, approach would be to combine the pure component and proportional mixture models into a single equivalent model (i.e. yielding numerically equal results) by restructuring eq. (9) as follows:

$$C_{SSP}=C_{SSmax}(1-f_{SS})(f_{LS}+r_{LS})(f_{SH}+r_{SH}) \tag{25}$$

where:

$r_{LS}$ residual limestone factor (fraction, non-normalized)

$r_{SH}$ residual shale factor (fraction, non-normalized)

However, this approach is less preferred because the residual factors $r_{LS}$ and $r_{SH}$ must be determined iteratively by trial and error until the desired concentrations are achieved. This process is exacerbated by the fact that a change to the residual factor of any one component affects the concentration of all other components. Also, the residual factors become numerically smaller as the number of components increases making it difficult to predict the required adjustments. Also, with the eq. (22), it is difficult to calculate the proportional mixture concentration. In short, although this is an equivalent mathematical model, it is much more difficult and laborious to apply in practice.

Figure 7:
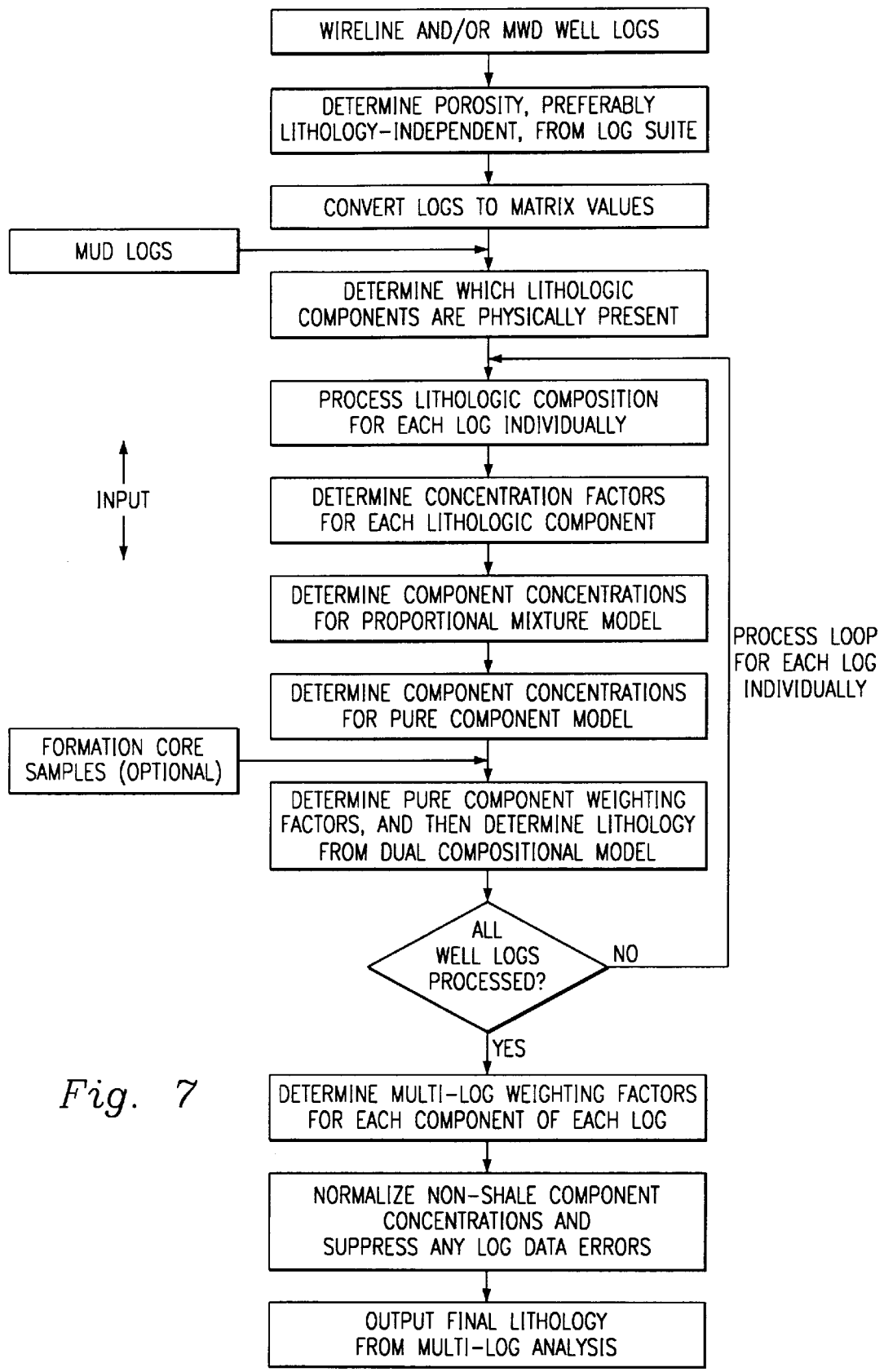
FIG. 7 is a flowchart of the method according to the present invention.

Thus, the foregoing description of the preferred embodiment of the present invention, illustrated graphically in the flowchart of FIG. 7, provides a new and improved method for determining the lithology of formations surrounding an earth borehole, and has at least the following advantages over the prior art:

- a dual compositional model defines the range of all possible solutions to mineralogical composition. A pure component model defines the upper limit of this range, and a proportional mixture model defines the lower limit. This allows the maximum concentration of any lithologic component to vary from 0–100%. Surprisingly, prior art models do not have this capability.
- the dual compositional model can be readily calibrated to a mineralogical analysis of actual core samples
- individual well logs can be weighted according to their ability to resolve a particular lithologic component
- the mathematical model is fault tolerant and consistently yields a reasonable solution even with bad log data; division by zero errors and negative concentration problems are avoided
- the method is applicable with any number or combination of lithology sensitive logs and any number or combination of lithologic components
- time-consuming trial and error analysis is minimized
- extinction limits for each component can be established based on laboratory measurement
- non-linear relationships between log data and lithologic composition can be modeled This invention has been described with a certain degree of specificity by way of example but not by way of limitation.

Those skilled in the art will devise obvious variations to the examples given herein but which will fall within the scope and spirit of this invention which is limited only by the appended claims.

What is claimed is:

1. A method for determining the lithology of formations surrounding an earth borehole, comprising:
    traversing an earth borehole with a well logging instrument and generating data with said instrument relating to the lithology of the formations surrounding said borehole as a function of depth in said borehole;
    generating a first lithology compositional model based upon said data to establish an upper limit of a range of values for each component of the lithology at a given depth in the borehole; and
    generating a second lithology compositional model based upon said data to establish a lower limit of a range of values for each component of the lithology at said given depth in the borehole, wherein the first and second models together provide a dual compositional model for establishing a complete range of possible values for each component of the lithology at a given depth in the borehole.

2. The method according to claim 1, wherein the upper limit of said range of values is defined by a pure component model, the pure component model characterized by guarantying that a given component concentration will be 100% pure at a pure component reference value of a respective well log.

3. The method according to claim 1, wherein the lower limit of said range of values is defined by a proportional mixture model, the proportional mixture model characterized by allowing a maximum concentration of any given component to drop to zero, while precluding the existence of any component in pure form.

4. The method according to claim 1, wherein the upper limit of said range of values is defined by a pure component model and the lower limit of said range of values is defined by a proportional mixture model, wherein the pure component model is characterized by guarantying that a given component concentration will be 100% pure at a pure component reference value of a respective well log, and wherein the proportional mixture model is characterized by allowing a maximum concentration of any given component to drop to zero, while precluding the existence of any component in pure form.

5. The method according to claim 1, including the additional step of determining an exact value for at least one component of the lithology within the range of values, said determining step being based, at least in part, upon analysis of at least one core sample taken from said given depth, further including calibrating the first and second models to the exact value of the at least one component.

6. The method according to claim 1, wherein said well logging instrument is embodied within a drillstring used for drilling an earth borehole.

7. The method according to claim 1, wherein said well logging instrument is suspended from the earth's surface in an earth borehole by a wireline cable.

8. A method for determining the lithology of formations surrounding an earth borehole, comprising:
    traversing an earth borehole with a well logging instrument and generating data with said instrument relating to the lithology of the formations surrounding said borehole as a function of depth in said borehole; and
    generating first and second lithology compositional models based upon said data which together provide a dual compositional model to allow the maximum concentration of any lithologic component of said formations to vary between 0% and 100%.

9. The method according to claim 8, wherein said first model comprises a pure component model characterized by guarantying that a given component concentration will be 100% pure at a pure component reference value of a respective well log.

10. The method according to claim 8, wherein said second model comprises a proportional mixture model characterized by allowing a maximum concentration of any given component to drop to zero, while precluding the existence of any component in pure form.

11. The method according to claim 8, wherein said first model comprises a pure component model characterized by guarantying that a given component concentration will be 100% pure at a pure component reference value of a respective well log and said second model comprises a proportional mixture model characterized by allowing a maximum concentration of any given component to drop to zero, while precluding the existence of any component in pure form.

12. A method for determining the lithology of formations surrounding an earth borehole, comprising:
    traversing an earth borehole with a well logging instrument and generating data with said instrument relating to the lithology of the formations surrounding said borehole as a function of depth in said borehole;
    generating a first lithology compositional model based upon said data to establish an upper limit of a range of values for each component of the lithology at a given depth in the borehole;
    generating a second lithology compositional model based upon said data to establish a lower limit of a range of values for each component of the lithology at said given depth in the borehole, wherein the first and second models together provide a dual compositional model for establishing a complete range of possible values for each component of the lithology at a given depth in the borehole; and calibrating said upper and lower limits of said range of values based upon an analysis of formation core samples taken at said given depth.

13. The method according to claim 12, wherein said core samples are taken from the formation surrounding the borehole through which the well logging instrument is traversing.

14. The method according to claim 12, wherein said core samples are taken from formations surrounding one or more boreholes offset from the borehole through which the well logging instrument is traversing.

15. A method for determining the lithology of formations surrounding an earth borehole, comprising:

traversing an earth borehole with a well logging instrument and generating data with said instrument relating to the lithology of formations surrounding said borehole as a function of depth in said borehole;

generating a first lithology compositional model based upon said data to establish an upper limit of a range of values for each component of the lithology at a given depth in the borehole;

generating a second lithology compositional model based upon said data to establish a lower limit of a range of values for each component of the lithology at said given depth in the borehole, wherein the first and second models together provide a dual compositional model for establishing a complete range of possible values for each component of the lithology at a given depth in the borehole; and calibrating said upper and lower limits of said range of values based upon an analysis of drill cuttings originating from said given depth.

16. The method according to claim 15, wherein said drill cuttings are taken from the formation surrounding the borehole through which the well logging instrument is traversing.

17. The method according to claim 15, wherein said drill cuttings are taken from formations surrounding one or more boreholes offset from the borehole through which the well logging instrument is traversing.

18. A method for determining the lithology of formations surrounding an earth borehole, comprising:

determining porosity of the formation as a function of depth from a log suite, the log suite having been obtained by traversing an earth borehole with a well logging instrument and generating data with the instrument relating to the lithology of formations surrounding the borehole as a function of depth in the borehole;

converting each log of the log suite into matrix values;

determining which lithologic components are physically present in the formations;

for each log of the log suite, processing lithologic composition by:

a) determining concentration factors for each lithologic component;

b) determining component concentrations for a proportional mixture model;

c) determining component concentrations for a pure component model; and d) determining pure component weighting factors, wherein a given lithology for a respective log is then determined from a dual compositional model, the dual compositional model including a weighted average of the proportional mixture model and the pure component model;

determining multi-log weighting factors for each component of each log;

normalizing non-shale component concentrations and suppressing any log data errors; and outputting a final lithology from a multi-log analysis.

19. An apparatus for determining the lithology of formations surrounding an earth borehole, comprising:

means for generating a first lithology compositional model based upon data relating to the lithology of the formations surrounding a borehole as a function of depth in the borehole, the first lithology compositional model to establish an upper limit of a range of values for each component of the lithology at a given depth in the borehole; and means for generating a second lithology compositional model based upon the data to establish a lower limit of a range of values for each component of the lithology at the given depth in the borehole, wherein the first and second models together provide a dual compositional model for establishing a complete range of possible values for each component of the lithology at a given depth in the borehole.

20. The apparatus of claim 19, wherein the upper limit of said range of values is defined by a pure component model and the lower limit of said range of values is defined by a proportional mixture model, wherein the pure component model is characterized by guarantying that a given component concentration will be 100% pure at a pure component reference value of a respective well log, and wherein the proportional mixture model is characterized by allowing a maximum concentration of any given component to drop to zero, while precluding the existence of any component in pure form.

21. An apparatus for determining the lithology of formations surrounding an earth borehole, comprising:

means for traversing in earth borehole with a well logging instrument and generating data with the instrument relating to the lithology of the formations surrounding the borehole as a function of depth in the borehole;

means for generating a first lithology compositional model based upon the data to establish an upper limit of a range of values for each component of the lithology at a given depth in the borehole; and means for generating a second lithology compositional model based upon the data to establish a lower limit of a range of values for each component of the lithology at the given depth in the borehole, wherein the first and second models together provide a dual compositional model for establishing a complete range of possible values for each component of the lithology at a given depth in the borehole.

22. The apparatus of claim 21, wherein the upper limit of the range of values is defined by a pure component model, the pure component model characterized by guarantying that a given component concentration will be 100% pure at a pure component reference value of a respective well log.

23. The apparatus of claim 21, wherein the lower limit of the range of values is defined by a proportional mixture model, the proportional mixture model characterized by allowing a maximum concentration of any given component to drop to zero, while precluding the existence of any component in pure form.

24. The apparatus of claim 21, wherein the upper limit of the range of values is defined by a pure component model and the lower limit of the range of values is defined by a proportional mixture model, wherein the pure component model is characterized by guarantying that a given component concentration will be 100% pure at a pure component reference value of a respective well log, and wherein the proportional mixture model is characterized by allowing a maximum concentration of any given component to drop to zero, while precluding the existence of any component in pure form.

25. The apparatus of claim 21, further comprising:

means for determining an exact value for at least one component of the lithology within the range of values, based at least in part upon an analysis of core samples taken from a given depth and calibrating the first and second models to the exact value of the at least one component.

26. An apparatus for determining the lithology of formations surrounding an earth borehole, comprising:

means for traversing in earth borehole with a well logging instrument and generating data with the instrument relating to the lithology of the formations surrounding the borehole as a function of depth in the borehole; and means for generating first and second lithology compositional models based upon the data which together provide a dual compositional model to allow the maximum concentration of any component of the lithology of the formations to vary between 0% and 100%.

27. The apparatus of claim 26, wherein the first model comprises a pure component model characterized by guarantying that a given component concentration will be 100% pure at a pure component reference value of a respective well log.

28. The apparatus of claim 26, wherein the second model comprises a proportional mixture model characterized by allowing a maximum concentration of any given component to drop to zero, while precluding the existence of any component in pure form.

29. The apparatus of claim 26, wherein the first model comprises a pure component model characterized by guarantying that a given component concentration will be 100% pure at a pure component reference value of a respective well log and the second model comprises a proportional mixture model characterized by allowing a maximum concentration of any given component to drop to zero, while precluding the existence of any component in pure form.

30. An apparatus for determining the lithology of formations surrounding an earth borehole, comprising:

means for traversing an earth borehole with a well logging instrument and generating data with the instrument relating to the lithology of the formations surrounding the borehole as a function of depth in the borehole;

means for generating a first lithology compositional model based upon the data to establish an upper limit of a range of values for each component of the lithology at a given depth in the borehole;

means for generating a second lithology compositional model based upon the data to establish a lower limit of a range of values for each component of the lithology at the given depth in the borehole, wherein the first and second models together provide a dual compositional model for establishing a complete range of possible values for each component of the lithology at a given depth in the borehole; and means for calibrating the upper and lower limits of the range of values based upon an analysis of at least one of the following selected from the group consisting of (i) core samples taken at a given depth and (ii) drill cuttings originating from a given depth.

* * * * *

UNITED STATES PATENT AND TRADEMARK OFFICE
CERTIFICATE OF CORRECTION

PATENT NO. : 6,044,327
DATED : March 28, 2000
INVENTOR(S) : Goldman

It is certified that error appears in the above-identified patent and that said Letters Patent is hereby corrected as shown below:

Col. 6, line 10, "th(e" should be --the--

Col. 8, line 53, "$(C_{LSP}+C_{SHP})$" should be --$(C_{SSP}+C_{LSP}+C_{SHP})$--

Col. 9, line 52, delete ":" after --the--

Col. 10, line 14, "oil" should be --of--

Col. 11, line 26, "$_{DENSITY}1$" should be --$_{DENSITY\ LOG}=1$--

Col. 12, line 43, delete ";" after --is--

Signed and Sealed this

Sixth Day of February, 2001

Attest:

Q. TODD DICKINSON

*Attesting Officer*  *Director of Patents and Trademarks*